(12) United States Patent
Okuno et al.

(10) Patent No.: US 12,190,032 B2
(45) Date of Patent: Jan. 7, 2025

(54) MATERIAL DESIGN DEVICE, MATERIAL DESIGN METHOD, AND MATERIAL DESIGN PROGRAM

(71) Applicant: SHOWA DENKO K.K., Tokyo (JP)

(72) Inventors: Katsuki Okuno, Tokyo (JP); Takuya Minami, Tokyo (JP); Shimpei Takemoto, Tokyo (JP); Eriko Takeda, Tokyo (JP); Yoshishige Okuno, Tokyo (JP); Masamichi Kitano, Tokyo (JP)

(73) Assignee: Showa Denko K.K., Tokyo (JP)

( * ) Notice: Subject to any disclaimer, the term of this patent is extended or adjusted under 35 U.S.C. 154(b) by 888 days.

(21) Appl. No.: 17/289,277

(22) PCT Filed: Oct. 30, 2019

(86) PCT No.: PCT/JP2019/042466

§ 371 (c)(1),
(2) Date: Apr. 28, 2021

(87) PCT Pub. No.: WO2020/090848

PCT Pub. Date: May 7, 2020

(65) Prior Publication Data

US 2021/0397769 A1    Dec. 23, 2021

(30) Foreign Application Priority Data

Oct. 30, 2018  (JP) ................................. 2018-204439

(51) Int. Cl.
*G06F 30/27*    (2020.01)
*C22C 1/00*    (2023.01)
*G06F 113/26*    (2020.01)

(52) U.S. Cl.
CPC ................ *G06F 30/27* (2020.01); *C22C 1/00* (2013.01); *G06F 2113/26* (2020.01)

(58) Field of Classification Search
CPC ......... G06F 30/27; G06F 2113/26; C22C 1/00
See application file for complete search history.

(56) References Cited

FOREIGN PATENT DOCUMENTS

| JP | 2003-178102 A | 6/2003 |
| JP | 2017-91526 A | 5/2017 |

OTHER PUBLICATIONS

Conduit BD, Jones NG, Stone HJ, Conduit GJ. Design of a nickel-base superalloy using a neural network. Materials & Design. Oct. 5, 2017;131:358-65. (Year: 2017).*

(Continued)

*Primary Examiner* — Chuen-Meei Gan
(74) *Attorney, Agent, or Firm* — Millen, White, Zelano & Branigan P.C.; William F. Nixon

(57) ABSTRACT

A material design device derives the optimal solution for a design condition satisfying a desired material property. A design condition setting unit for setting a specified range of a design condition of a material to be designed. A comprehensive prediction point generation unit generates a plurality of comprehensive prediction points within the specified range set by the design condition setting unit. A design condition-material property table stores data sets in which each point of the comprehensive prediction points is associated with a material property value calculated by inputting the comprehensive prediction points generated by the comprehensive prediction point generation unit, to a learned model. A required property setting unit sets a specified range of a required property of the material. A design condition extraction unit extracts, from the design condition-material property table, a data set satisfying the required property set by the required property setting unit.

30 Claims, 11 Drawing Sheets

(56) References Cited

OTHER PUBLICATIONS

Malinov S, Sha W, Mckeown JJ. Modelling the correlation between processing parameters and properties in titanium alloys using artificial neural network. Computational materials science. Jul. 1, 2001;21(3):375-94. (Year: 2001).*
Malinov Set al: "Modelling the correlation between processing parameters and properties in titanium alloys using articial neural network", Computational Materials Science 21 (2001) pp. 375-394; Dec. 2001 (Dec. 31, 2001), XP055933339.
Conduit B D et al: "Design of a nickel-base superalloy using a neural network", Materials & Design, vol. 131, Jun. 10, 2017 (Jun. 10, 2017), pp. 358-365, XP085148873, ISSN: 0264-1275, DOI: 10.1016/J.MATDES.2017.06.007.
Sun Yet al: "Optimization of chemical composition for TCII titanium alloy based on artificial neural network and genetic algorithm", Computational Materials Science, Elsevier, Amsterdam, NL, vol. 50, No. 3, Jan. 1, 2011 (Jan. 1, 2011), pp. 1064-1069, XP027574890,ISSN: 0927-0256.
Search report in corresponding EP application 19880532.7 dated Jul. 6, 2022 (pp. 1-10).
International Search Report dated Dec. 24, 2019 issued in corresponding PCT/JP2019/042466 application (1 page).
T. Iwase et al., "Simultaneous Prediction of Multiple Physical Properties Using Multi-Task Learning", IEICE Technical Report, vol. 113 No. 476 (2014) pp. 9-13.
English Abstract of JP 2003-178102 A published Jun. 27, 2003.
English Abstract of JP 2017-091526 A published May 25, 2017.

\* cited by examiner

| | Production condition | | | Material composition | | | | Material property | | |
|---|---|---|---|---|---|---|---|---|---|---|
| | Temp. [°C] | Heating time [h] | ... | Si [wt%] | Fe [wt%] | Cu [wt%] | ... | Tensile strength | 0.2% strength | ... |
| 1 | | | | | | | | | | |
| 2 | | | | | | | | | | |
| ... | | | | | | | | | | |

Fig.5

| Required property | Composition | Product condition | | | | |
|---|---|---|---|---|---|---|
| Axis | Property | | Condition | | Min. | Max. |
| ☑ | Tensile strength (MPa) | ∨ | Room Temp. | ∨ | a | b |
| ☑ | 0.2% strength (MPa) | ∨ | Room Temp. | ∨ | c | d |
| ☐ | Elongation | ∨ | Room Temp. | ∨ | | |
| ☐ | Linear expansion coefficient (ppm/°C) | ∨ | 20–100°C | ∨ | | |
| ☐ | Young's modulus (GPa) | ∨ | Room Temp. | ∨ | | |
| ☐ | Fatigue property (MPa) | ∨ | Room Temp., 5e8 cycle | ∨ | | |

MATERIAL DESIGN DEVICE, MATERIAL DESIGN METHOD, AND MATERIAL DESIGN PROGRAM

TECHNICAL FIELD

The present invention relates to a material design device, a material design method, and a material design program.

BACKGROUND ART

Conventionally, when designing a material composed of a plurality of compositions or a material to be produced by combining a plurality of production conditions, an optimal solution capable of realizing desired material properties is acquired by repeating trial productions while adjusting material compositions and production conditions based on the experience of the material developer.

However, in some cases, such an experience-based trial production by a material developer requires production repetition until the optimal design is acquired, which takes time and effort. In addition, a condition search is often performed locally in the vicinity of a design condition that has been previously performed by the material developer, which is not suitable for a globally optimal design condition search.

Under the circumstances, for example, Patent Document 1 proposes a material design support system in which, when a material designer specifies the desired material function, the material candidates satisfying the specified condition are presented. In the system of Patent Document 1, a machine learning system, such as, e.g., a neural network, can be used as a tool for deriving design conditions of the material satisfying the desired material functions (properties) or performing a so-called reverse problem analysis, which makes it possible to efficiently predict candidate materials.

PRIOR ART DOCUMENT

Patent Document

Patent Document 1: Japanese Unexamined Patent Application Publication No. 2003-178102

SUMMARY OF THE INVENTION

Problems to be Solved by the Invention

However, in the conventional configuration in which a machine learning system is applied to a reverse problem analysis described in Patent Document 1 or the like, calculations are performed to gradually reach the optimal solution while performing an adjustment in order for each property in a case where there are plural kinds of desired material properties. In many cases, a plurality of material properties has a trade-off relation, and the trial and error are repeated until it reaches the optimal solution. Therefore, although the burden on the material designer is reduced by using a machine learning system, there is still room for improvement in the time required to obtain the optimal solution of the production condition.

The preferred embodiments of the present invention have been made in view of the above-described and/or other problems in the related art. The preferred embodiments of the present invention can significantly improve upon the existing methods and/or devices.

The present invention aims to provide a material design device, a material design method, and a material design program capable of deriving an optimal solution of a design condition satisfying desired material properties in a short time.

The other objects and advantages of the present invention will be apparent from the following preferred embodiments.

Means for Solving the Problem

The present invention has the following configuration.

[1] A material design device for designing a material to be designed including a material composed of a plurality of compositions or a material produced by combining a plurality of production conditions, the material design device comprising:
a learned model in which a correspondence between input information including a design condition of the material to be designed and output information including a material property value are acquired by machine learning;
a design condition setting unit configured to set a specified range of the design condition of the material to be designed;
a comprehensive prediction point generation unit configured to generate a plurality of comprehensive prediction points within the specified range set by the design condition setting unit;
a design condition-material property table configured to store data sets in which a material property value calculated by inputting the comprehensive prediction points generated by the comprehensive prediction point generation unit to the learned model is associated with each point of the comprehensive prediction points;
a required property setting unit configured to set a specified range of a required property of the material to be designed; and
a design condition extraction unit configured to extract data sets satisfying the required property set by the required property setting unit from the design condition-material property table.

[2] The material design device as recited in the above-described Item [1], further comprising:
a design condition adjustment unit configured to adjust a range of a design condition of the data set extracted by the design condition extraction unit,
wherein the design condition extraction unit further narrows down from the extracted data sets to data sets satisfying the design condition adjusted by the design condition adjustment unit.

[3] The material design device as recited in the above-described Item [2], further comprising:
an information display unit configured to display the required property and the range of the design condition related to the data sets extracted by the design condition extraction unit,
wherein the design condition adjustment unit adjusts the range of the design condition in response to a user operation that changes the range of the design condition displayed on the information display unit.

[4] The material design device as recited in any one of the above-described Items [1] to [3],
wherein the required property includes a plurality of properties, and
wherein the design condition extraction unit extracts the data set that simultaneously satisfies the plurality of required properties.

[5] The material design device as recited in the above-described Item [4],
wherein the material to be designed is an inorganic material.

[6] The material design device as recited in the above-described Item [5],
wherein the material to be designed is an alloy material.

[7] The material design device as recited in the above-described Item [6],
wherein the material to be designed is an aluminum alloy working material,
wherein the design condition includes a material composition and a production condition,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of material casting, a casting speed, an amount of cooling water, a homogenization temperature, a homogenization time, and a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, Young's modulus, a linear expansion coefficient, and a fatigue property.

[8] The material design device as recited in the above-described Item [6],
wherein the material to be designed is an aluminum alloy casting material,
wherein the design condition includes a material composition and a production condition,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at the time of casting, a solution treatment temperature, a solution treatment time, a natural aging time, an artificial aging temperature, an artificial aging time, an annealing temperature, and annealing time,
wherein the material property value includes at least one of 0.2% strength, tensile strength, elongation, Young's modulus, a linear expansion coefficient, and a fatigue property.

[9] The material design device as recited in the above-described Item [6],
wherein the material to be designed is an iron alloy working material,
wherein the design condition includes a material composition and a production condition,
wherein the material composition includes at least one of C, B, N, Si, P, S, Mn, Al, Ti, V, Cr, Co, Ni, Cu, Zr, Nb, Mo, and W,
wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and
wherein the material property value includes at least one of 0.2% strength, tensile strength, elongation, Young's modulus, a linear expansion coefficient, an austenite grain size, a ferrite grain size, an impact property, a fatigue property, an SCC property, and an SSC property.

[10] The material design device as recited in the above-described Item [6],
wherein the material to be designed is a casting iron material,
wherein the design condition includes a material composition and a production condition,
wherein the material composition includes at least one of C, B, N, Si, P, S, Mn, Al, Ti, V, Cr, Co, Ni, Cu, Zr, Nb, Mo, W, Ca, Mg, and Ce,
wherein the production condition includes at least one of a molten metal temperature at a time of casting, a casting speed, a solidification rate, a cooling rate after solidification, a heat treatment temperature, a heat treatment time, and a cooling rate of a heat treatment, and
wherein the material property value includes at least one of 0.2% strength, tensile strength, elongation, Young's modulus, a linear expansion coefficient, an impact property, and a fatigue property.

[11] The material design device as recited in the above-described Item [6],
wherein the material to be designed is a copper alloy working material,
wherein the design condition includes a material composition and a production condition,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of a molten metal temperature at a time of material casting, a casting speed, an amount of cooling water, a homogenization temperature, a homogenization time, a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, conductivity, thermal conductivity, Young's modulus, and a linear expansion coefficient.

[12] The material design device as recited in the above-described Item [6],
wherein the material to be designed is a copper alloy casting material,
wherein the design condition includes a material composition and a production condition,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of a molten metal temperature at a time of casting, a solution treatment temperature, a solution treatment time, a natural aging time, an artificial aging temperature, an artificial aging time, an annealing temperature, and an annealing time, and wherein the material property value includes at least one of 0.2% strength, tensile strength, elongation, conductivity, thermal conductivity, Young's modulus, and a linear expansion coefficient.

[13] The material design device as recited in the above-described Item [6],
wherein the material to be designed is a titanium alloy,
wherein the design condition includes a material composition and a production condition,
wherein the material composition includes at least one of Al, Sn, V, Mo, Zr, Pd, Si, Cr, Ru, Ta, Co, and Ni,
wherein the production condition includes a molten metal temperature at a time of casting, a solution treatment temperature, a solution treatment time, and an artificial aging temperature, an artificial aging time, an annealing temperature, and an annealing time, and
wherein the material property value includes at least one of 0.2% strength, tensile strength, elongation, Young's modulus, a linear expansion coefficient, and a fatigue property.

[14] A material design method for designing a material to be designed including a material including a material composed of a plurality of compositions or a material produced by combining a plurality of production conditions,
the material design method comprising:
a model generation step of generating a learned model in which a correspondence between input information including a design condition of the material to be designed and output information including a material property value is acquired by machine learning;
a design condition setting step of setting a specified range of the design condition of the material to be designed;
a comprehensive prediction point generation step of generating a plurality of comprehensive prediction points within the specified range set by the design condition setting step;
a data set generation step of storing, to a design condition-material property table, a data set in which a material property value calculated by inputting the comprehensive prediction points generated by the comprehensive prediction point generation step to the learned model is associated with each point of the comprehensive prediction points;
a required property setting step of setting a specified range of a specified range of a required property of the material to be designed; and
a design condition extraction step of extracting data sets satisfying the required property set by the required property setting step from the design condition-material property table.

[15] The material design method as recited in the above-described Item [14], further comprising:
a design condition adjustment step of adjusting a range of a design condition of the data set extracted by the design condition extraction step; and
a narrow down step of further narrowing down from the extracted data sets satisfying the required property to the data sets satisfying the design condition adjusted by the design condition adjustment step.

[16] The material design method as recited in the above-described Item [14] or [15],
wherein the material to be designed is an aluminum alloy working material,
wherein the design condition includes a material composition and a production condition,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of material casting, a casting speed, an amount of cooling water, a homogenization temperature, a homogenization time, a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, Young's modulus, a linear expansion coefficient, and a fatigue property.

[17] The material design method as recited in the above-described Item [14] or [15],
wherein the material to be designed is an aluminum alloy casting material,
wherein the design condition includes a material composition and a production condition,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of casting, a solution treatment temperature, a solution treatment time, a natural aging time, an artificial aging temperature, an artificial aging time, and an annealing temperature, and an annealing time, and
wherein the material property value includes at least one of 0.2% strength, tensile strength, elongation, Young's modulus, a linear expansion coefficient, and a fatigue property.

[18] The material design method as recited in the above-described Item [14] or [15],
wherein the material to be designed is an iron alloy working material,
wherein the design condition includes a material composition and a production condition,
wherein the material composition includes at least one of C, B, N, Si, P, S, Mn, Al, Ti, V, Cr, Co, Ni, Cu, Zr, Nb, Mo, and W,
wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and
wherein the material property value includes at least one of 0.2% strength, tensile strength, elongation, Young's modulus, a linear expansion coefficient, an austenite grain size, a ferrite grain size, an impact property, a fatigue property, an SCC property, and an SSC property.

[19] The material design method as recited in the above-described Item [14] or [15],
wherein the material to be designed is a casting iron material,
wherein the design condition includes a material composition and a production condition, wherein the material composition includes at least one of C, B, N, Si, P, S, Mn, Al, Ti, V, Cr, Co, Ni, Cu, Zr, Nb, Mo, W, Ca, Mg, and Ce, wherein the production condition includes at least one of a molten metal temperature at a time of casting, a casting speed, a solidification rate, a cooling rate after solidification, a heat treatment temperature, a heat treatment time, and a cooling rate of a heat treatment, and wherein the material property value includes at least one of 0.2% strength, tensile strength, elongation, Young's modulus, a linear expansion coefficient, an impact property, and a fatigue property.

[20] The material design method as recited in the above-described Item [14] or [15], wherein the material to be designed is a copper alloy working material, wherein the design condition includes a material composition and a production condition, wherein the material composition includes at least one of Zn, Pb, Bi, Sn, Fe, P, Al, Hg, Ni, Mn, Se, Te, O, S, Zr, Be, Co, Ti, and As, wherein the production condition includes at least one of a molten metal temperature at a time of material casting, a casting speed, an amount of cooling water, a homogenization temperature, a homogenization time, a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and wherein the material property value includes at least one of 0.2% strength, tensile strength, elongation, conductivity, thermal conductivity, Young's modulus, and a linear expansion coefficient.

[21] The material design method as recited in the above-described Item [14] or [15], wherein the material to be designed is a copper alloy casting material, wherein the design condition includes a material composition and a production condition, wherein the material composition includes at least one of Zn, Pb, Bi, Sn, Fe, P, Al, Hg, Ni, Mn, Se, Te, O, S, Zr, Be, Co, Ti, and As, wherein the production condition includes at least one of a molten metal temperature at a time of casting, a solution treatment temperature, a solution treatment time, a natural aging time, an artificial aging temperature, an artificial aging time, an annealing temperature, and an annealing time, and wherein the material property value includes at least one of 0.2% strength, tensile strength, elongation, conductivity, thermal conductivity, Young's modulus, and a linear expansion coefficient.

[22] The material design method as recited in the above-described Item [14] or [15], wherein the material to be designed is a titanium alloy, wherein the design condition includes a material composition and a production condition, wherein the material composition includes at least one of Al, Sn, V, Mo, Zr, Pd, Si, Cr, Ru, Ta, Co, and Ni, wherein the production condition includes a molten metal temperature at a time of casting, a solution treatment temperature, a solution treatment time, an artificial aging temperature, an artificial aging time, an annealing temperature, and an annealing time, and wherein the material property value includes at least one of 0.2% strength, tensile strength, elongation, Young's modulus, a linear expansion coefficient, and a fatigue property.

[23] A material design program for designing a material to be designed including a material including a material composed of a plurality of compositions or a material produced by combining a plurality of production conditions, the material design program makes a computer realize:

a model generation function of generating a learned model in which a correspondence between input information including a design condition of the material to be designed and output information including a material property value is acquired by machine learning;

a design condition setting function of setting a specified range of the design condition of the material to be designed;

a comprehensive prediction point generation function of generating a plurality of comprehensive prediction points within the specified range set by the design condition setting function;

a data set generation function of storing, in a design condition-material property table, data sets in which a material property value calculated by inputting the comprehensive prediction points generated by the comprehensive prediction point generation function to the learned model is associated with each point of the comprehensive prediction points;

a required property setting function of setting a specified range of a required property of the material to be designed; and a design condition extraction function of extracting the data set satisfying the required property set by the required property setting function from the design condition-material property table.

[24] The material design program as recited in the above-described Item [23], wherein the program makes a computer realize:

a design condition adjustment function of adjusting a range of the design condition of the data set extracted by the design condition extraction function; and a narrow down function of further narrowing down from the extracted data sets satisfying the required property to the data set satisfying the design condition adjusted by the design condition adjustment function.

[25] The material design program as recited in the above-described Item [23] or [24], wherein the material to be designed is an aluminum alloy working material, wherein the design condition includes a material composition and a production condition, wherein the material composition includes at least one of Si, Fe, Cu, Mn, Mg, Cr, Ni, Zn, Ti, V, Pb, Sn, Bi, B, P, Zr, and Sr, wherein the production condition includes at least one of a molten metal temperature at a time of material casting, a casting speed, an amount of cooling water, a homogenization temperature, a homogenization time, and a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and wherein the material property value includes at least one of 0.2% strength, tensile strength, and elongation, Young's modulus, a linear expansion coefficient, and a fatigue property.

[26] The material design program as recited in the above-described Item [23] or [24],
wherein the material to be designed is an aluminum alloy casting material,
wherein the design condition includes a material composition and a production condition,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of casting, a solution treatment temperature, a solution treatment time, a natural aging time, an artificial aging temperature, an artificial aging time, an annealing temperature, and an annealing time, and
wherein the material property value includes at least one of 0.2% strength, tensile strength, elongation, Young's modulus, a linear expansion coefficient, and a fatigue property.

[27] The material design program as recited in the above-described Item [23] or [24],
wherein the material to be designed is an iron alloy working material,
wherein the design condition includes a material composition and a production condition,
wherein the material composition includes at least one of C, B, N, Si, P, S, Mn, Al, Ti, V, Cr, Co, Ni, Cu, Zr, Nb, Mo, and W,
wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and
wherein the material property value includes at least one of 0.2% strength, tensile strength, elongation, Young's modulus, a linear expansion coefficient, an austenite grain size, a ferrite grain size, an impact property, a fatigue property, an SCC property, and an SSC property.

[28] The material design program as recited in the above-described Item [23] or [24],
wherein the material to be designed is a casting iron material,
wherein the design condition includes a material composition and a production condition,
wherein the material composition includes at least one of C, B, N, Si, P, S, Mn, Al, Ti, V, Cr, Co, Ni, Cu, Zr, Nb, Mo, W, Ca, Mg, and Ce,
wherein the production condition includes at least one of a molten metal temperature at a time of casting, a casting speed, a solidification rate, a cooling rate after solidification, a heat treatment temperature, a heat treatment time, and a cooling rate of a heat treatment, and
wherein the material property value includes at least one of 0.2% strength, tensile strength, elongation, Young's modulus, a linear expansion coefficient, an impact property, and a fatigue property.

[29] The Material design program as recited in the above-described Item [23] or [24],
wherein the material to be designed is a copper alloy working material,
wherein the design condition includes a material composition and a production condition,
wherein the material composition includes at least one of Zn, Pb, Bi, Sn, Fe, P, Al, Hg, Ni, Mn, Se, Te, O, S, Zr, Be, Co, Ti, and AS,
wherein the production condition includes at least one of a molten metal temperature at a time of material casting, a casting speed, an amount of cooling water, a homogenization temperature, a homogenization time, a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, conductivity, thermal conductivity, Young's modulus, and a linear expansion coefficient.

[30] The material design program as recited in the above-described Item [23] or [24],
wherein the material to be designed is a copper alloy casting material,
wherein the design condition includes a material composition and a production condition,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of the molten metal temperature at a time of casting, a solution treatment temperature, a solution treatment time, a natural aging time, an artificial aging temperature, an artificial aging time, an annealing temperature, and an annealing time, and
wherein the material property value includes at least one of 0.2% strength, tensile strength, elongation, conductivity, thermal conductivity, Young's modulus, and a linear expansion coefficient.

[31] The material design program as recited in the above-described Item [23] or [24],
wherein the material to be designed is a titanium alloy,
wherein the design condition includes a material composition and a production condition,
wherein the material composition includes at least one of Al, Sn, V, Mo, Zr, Pd, Si, Cr, Ru, Ta, Co, and Ni,
wherein the production condition includes a molten metal temperature at a time of casting, a solution treatment temperature, a solution treatment time, and an artificial aging temperature, an artificial aging time, an annealing temperature, and an annealing time, and
wherein the material property value includes at least one of 0.2% strength, tensile strength, elongation, Young's modulus, a linear expansion coefficient, and a fatigue property.

Effects of the Invention

According to the present invention, it is possible to provide a material design device, a material design method, and a material design program capable of deriving an optimal solution of design conditions satisfying desired material properties in a short time.

BRIEF DESCRIPTION OF THE DRAWINGS

FIG. 2 is a diagram showing one example of an input screen of a design condition setting unit.

FIG. 3 is a diagram showing one example of an input screen of s design condition setting unit.

FIG. 5 is a diagram showing one example of a configuration of a design condition-material property table.

FIG. 6 is a diagram showing one example of an input screen of a required property setting unit.

EMBODIMENTS FOR CARRYING OUT THE INVENTION

Figure 1:
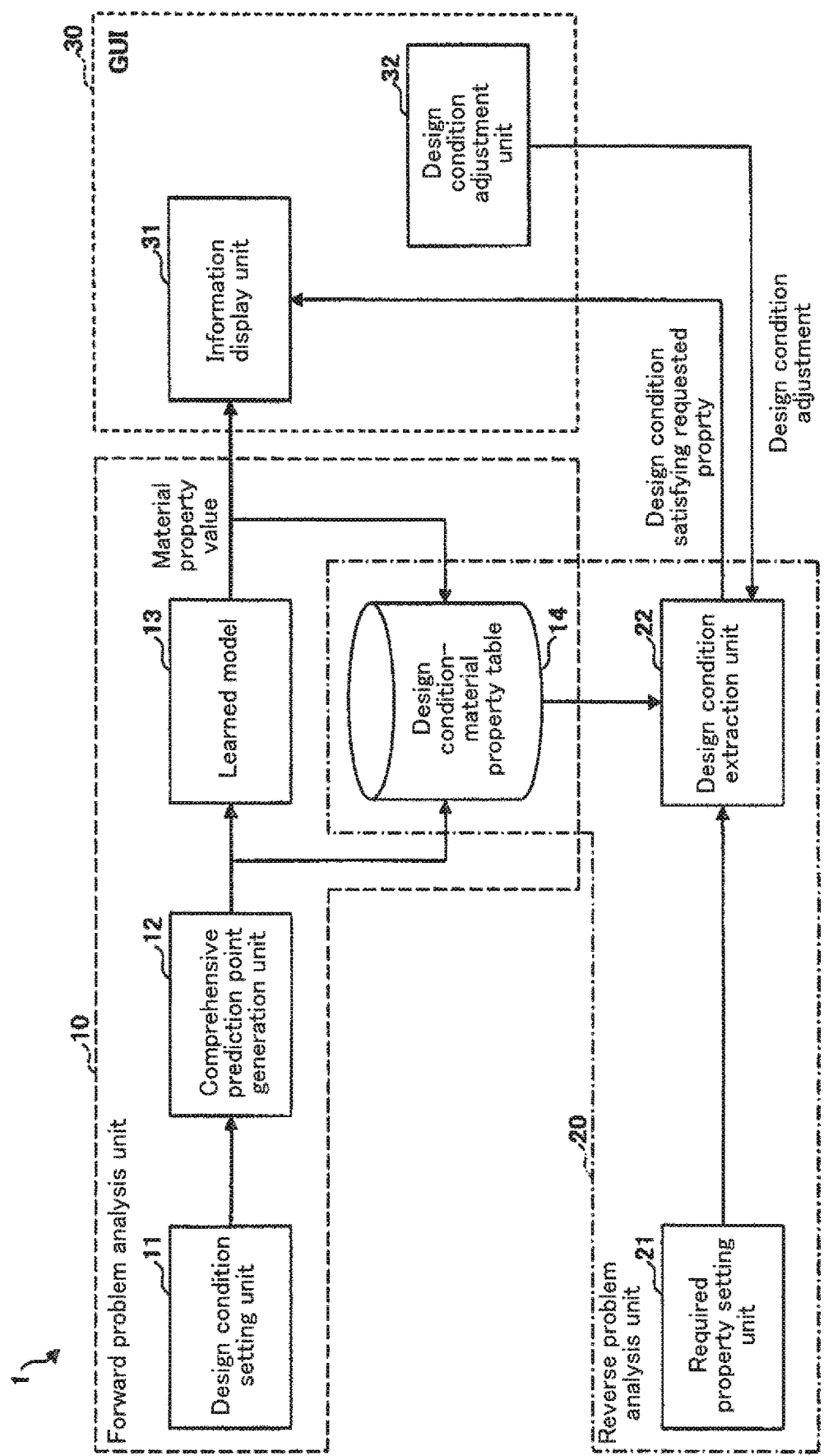
FIG. 1 is a diagram showing a schematic configuration of a material design device according to an embodiment.

Hereinafter, an embodiment will be described with reference to the attached drawings. To make the description easier to understand, the same constitutional elements are denoted by the same reference numerals as much as possible in the respective drawings, and the repetitive explanation will be omitted.

With reference to FIG. 1 to FIG. 9, the configuration of a material design device 1 according to an embodiment will be described. FIG. 1 is a block diagram showing the schematic configuration of the material design device 1 according to an embodiment. The material design device 1 is a device for designing a material to be designed including a material composed of a plurality of compositions or a material to be produced by combining a plurality of production conditions. In this embodiment, the description will be made by exemplifying an aluminum alloy working as one example of the material to be designed.

As shown in FIG. 1, the material design device 1 is provided with a forward problem analysis unit 10, a reverse problem analysis unit 20, and a GUI (Graphical User Interface) 30. The forward problem analysis unit 10 outputs material properties satisfying the desired design condition of the material designer by using a learned model 13. The reverse problem analysis unit 20 outputs a design condition satisfying the required properties desired by the material designer by using a design condition-material property table 14 generated based on the output result of the forward problem analysis unit 10. The GUI 30 is a user interface having a function of displaying the output result of the forward problem analysis unit 10 and that of the reverse problem analysis unit 20 to present it to the material designer or a function of accepting adjustment operations of the output result by the material designer.

The forward problem analysis unit 10 is provided with a design condition setting unit 11, a comprehensive prediction point generation unit 12, a learned model 13, and a design condition-material property table 14.

The design condition setting unit 11 is configured to set a specified range of the design condition of an aluminum alloy which is a material to be designed. The design condition setting unit 11 can set the specified range of the design condition by, for example, displaying an input screen of design conditions on the GUI 30 to prompt the material designer to input a specified range.

Figure 2:
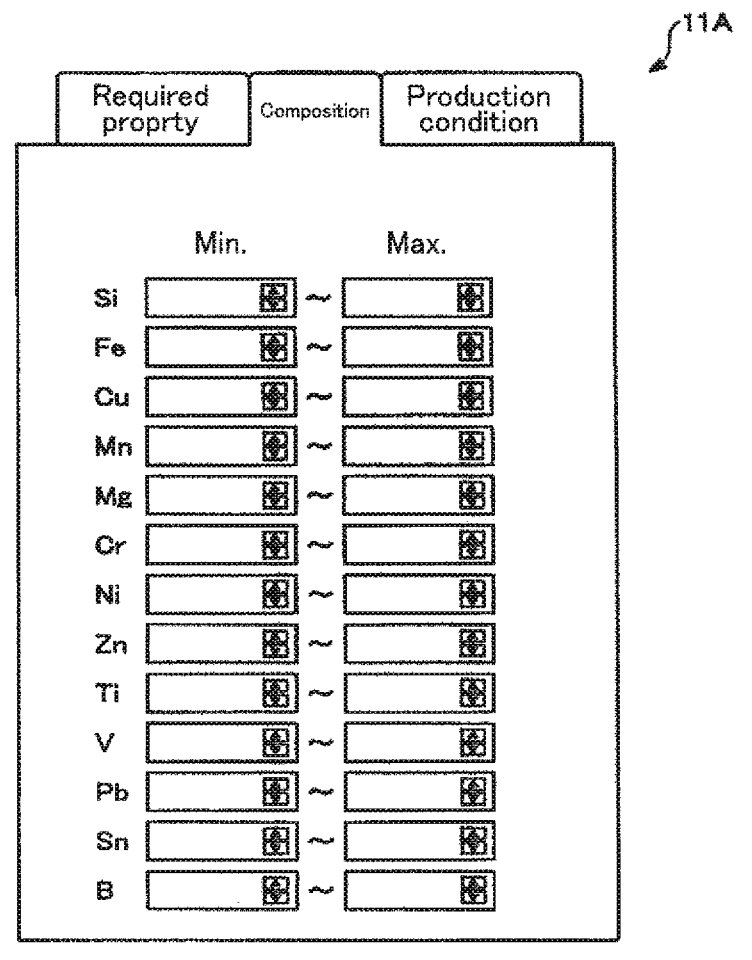
Figure 3:
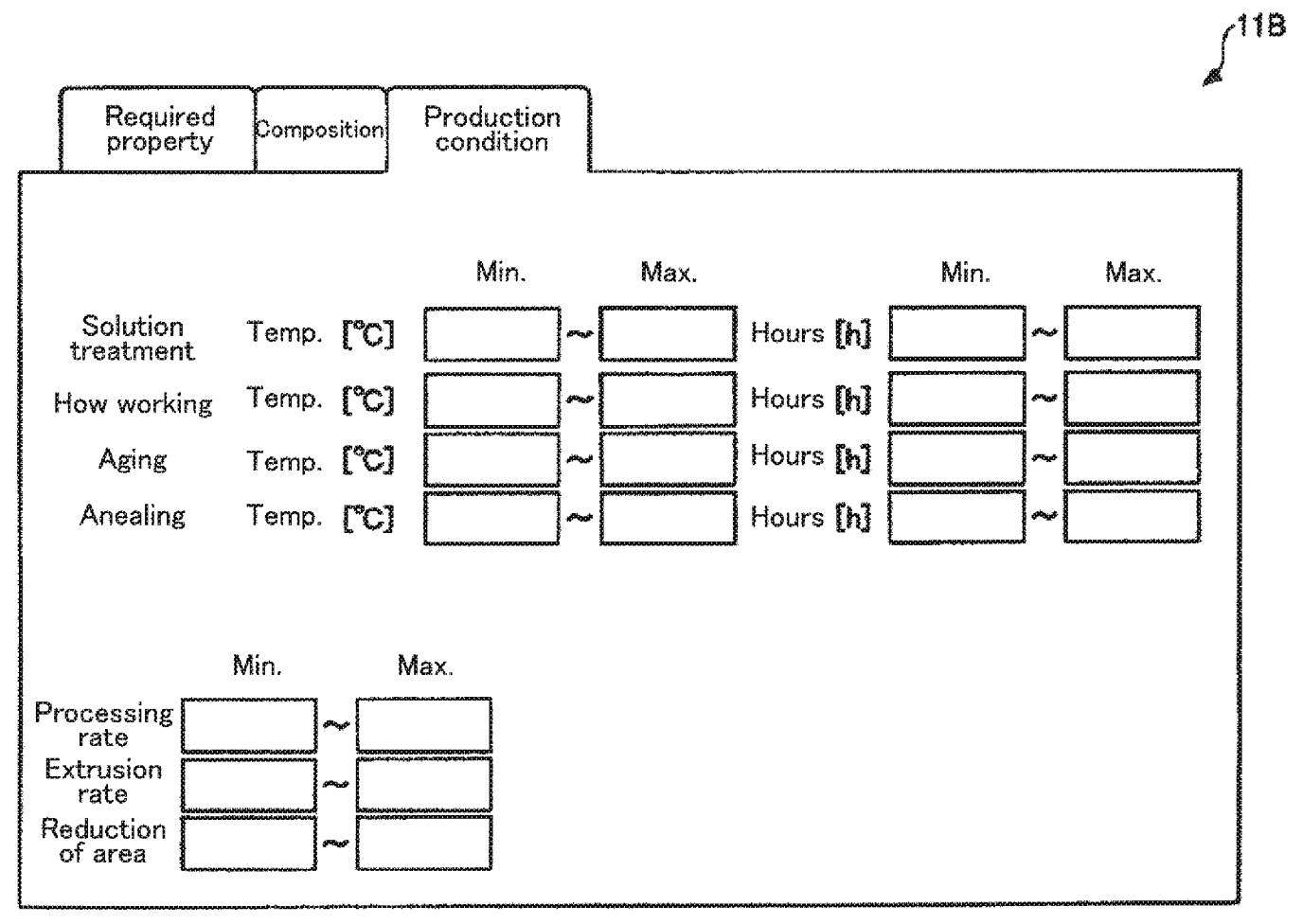

FIG. 2 and FIG. 3 are diagrams showing examples of input screens 11A and 11B of the design condition setting unit 11. FIG. 2 shows an example of the input screen 11A of the items relating to the composition of a raw material among the design conditions. FIG. 3 shows an example of the input screen 11B of the items relating to the production condition among the design conditions. In the input screens 11A and 11B, the maximum value and the minimum value of each item (in the item relating to a heat treatment, a temperature (° C.) and an execution time (h)) can be input. Note that the input screens 11A and 11B may be displayed collectively on one screen.

The items of the composition of the raw material include, for example, elements, such as, e.g., Si, Fe, Cu, Mn, Mg, Cr, Ni, Zn, Ti, V, Pb, Sn, Bi, B, P, Zr, and Sr as an additive in percentage by mass (wt %). Note that the percentage by mass of Al is represented by 100%—(the sum of the percentage by mass of the above-described elements).

As the items of the production condition, the items related to a heat treatment include, for example, the temperature (° C.) and the execution time (h) of each processing, such as, e.g., annealing, a solution heat treatment, an artificial aging treatment, a natural aging treatment, a hot working treatment, a cold working treatment, and a stabilizing treatment. The items related to processing conditions include, for example, a processing rate, an extrusion rate, a reduction of area, and a product shape.

The comprehensive prediction point generation unit 12 generates a plurality of comprehensive prediction points within the specified range of the design condition set by the design condition setting unit 11. For example, in a case where a percentage by mass of Si in the composition item and a range of execution time of annealing in the production condition item are specified, first, a plurality of numerical values is calculated within a specified range of the percentage by mass of Si and within the specified range of the annealing execution time in random or predetermined intervals, respectively, and all combinations of the plurality of numerical values in each item are generated. These combinations are output as comprehensive prediction points.

The learned model 13 is a model formulated by acquiring the correspondence between the input information including the design condition of the aluminum alloy and the output information including the material property value acquired by machine learning. For example, a supervised learning model, such as, e.g., a neural network and a genetic algorithm, can be applied to the learned model 13. In the learned model 13, learning data including design conditions and material properties of aluminum alloys is acquired from, for example, a known material database, and machine learning is performed using the learning data.

The items of material properties include tensile strength, 0.2% strength, elongation, a linear expansion coefficient, Young's modulus, a Poisson's ratio, a fatigue property, hardness, and creep properties including creep strength and creep strain, shear strength, specific heat capacity, thermal conductivity, electrical resistivity, density, a solidus line, and a liquidus line.

Figure 4:
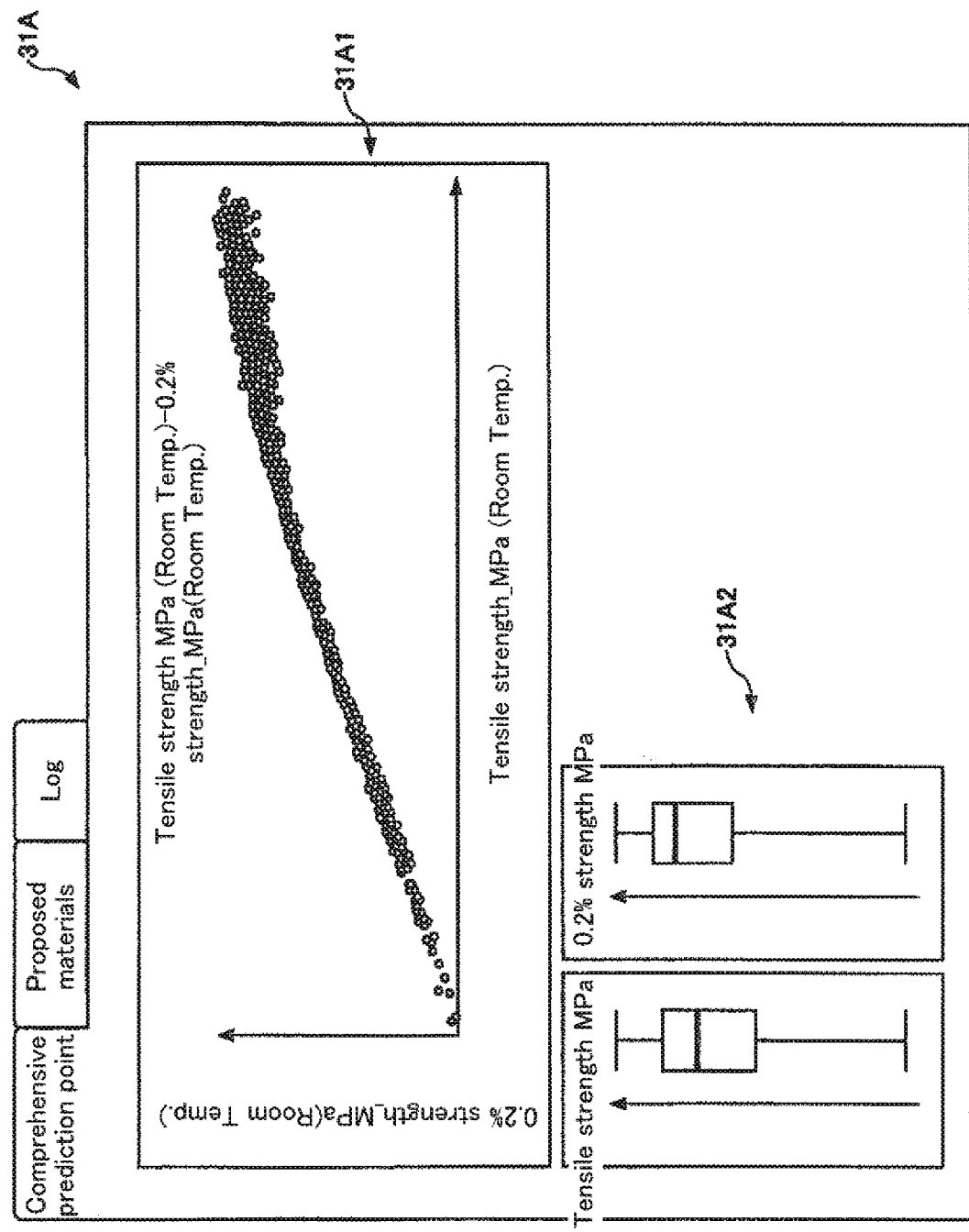
FIG. 4 is a diagram showing one example of an output screen of a forward problem analysis unit.

FIG. 4 is a diagram showing an example of an output screen 31A of the forward problem analysis unit 10. The output screen 31A is displayed on the GUI 30 via, for example, the information display unit 31. In FIG. 4, the output (material properties) of the learned model 13 are limited to only two output, i.e., "tensile strength" and "0.2% strength", for simplicity of explanation. In the example of FIG. 4, at the upper portion of the output screen 31A, a graph 31A1 is displayed in which each point of the comprehensive prediction points is plotted on the two-dimensional coordinate system with two output of the learned model, i.e., the "tensile strength" and the "0.2% strength", as the respective axes, and at the lower portion of the output screen 31A, box-and-whisker plots 31A2 of each material property is displayed.

The design condition-material property table 14 stores data sets in which the material property values calculated by inputting the comprehensive prediction points generated by the comprehensive prediction point generation unit 12 to the learned model 13 are associated with the respective points of the comprehensive prediction points. When performing the calculation of the comprehensive prediction points by the learned model 13, the forward problem analysis unit 10 stores the output in the design condition-material property table 14 by associating with the comprehensive prediction points (inputs). FIG. 5 is a diagram showing an example of the configuration of the design condition-material property table 14. As shown in FIG. 5, the inputs (production conditions, material compositions) and the output (material properties) of a learned model are put together as one data set and recorded on the same row of the design condition-material property table 14. Each row of the design condition-material property table 14 is an individual data set, and each column records numerical values of each item of the inputs and the output of the learned models 13.

As described above, the forward problem analysis unit 10 is configured to automatically generate data sets of design conditions and material properties covering all of the range of multidimensional design conditions by simply performing operations of specifying the range of the multidimensional design conditions by the material designer.

The reverse problem analysis unit 20 is provided with a required property setting unit 21 and a design condition extraction unit 22. Further, the above-described design condition-material property table 14 is also included in the reverse problem analysis unit 20.

The required property setting unit 21 sets a specified range of a required property of an aluminum alloy which is a material to be designed. The required property setting unit 21 can set specified ranges of required properties by, for example, displaying an input screen for required properties on the GUI 30 to prompt the material designer to input specified ranges.

FIG. 6 is a diagram showing an example of an input screen 21A of the required property setting unit 21. The items of required properties are the same as those of the material properties described above. In the example of FIG. 6, the "tensile strength" and the "0.2% strength" are selected as the required properties, the numerical value "a" is input as the minimum value of the "tensile strength", the numerical value "b" is input as the maximum value, the numerical value "c" is input as the minimum value of the tensile strength of "0.2% required properties", and the numerical value "d" is input as the minimum value.

The design condition extraction unit 22 extracts the data sets satisfying the required properties set by the required property setting unit 21 from the design condition-material property table 14.

Figure 7:
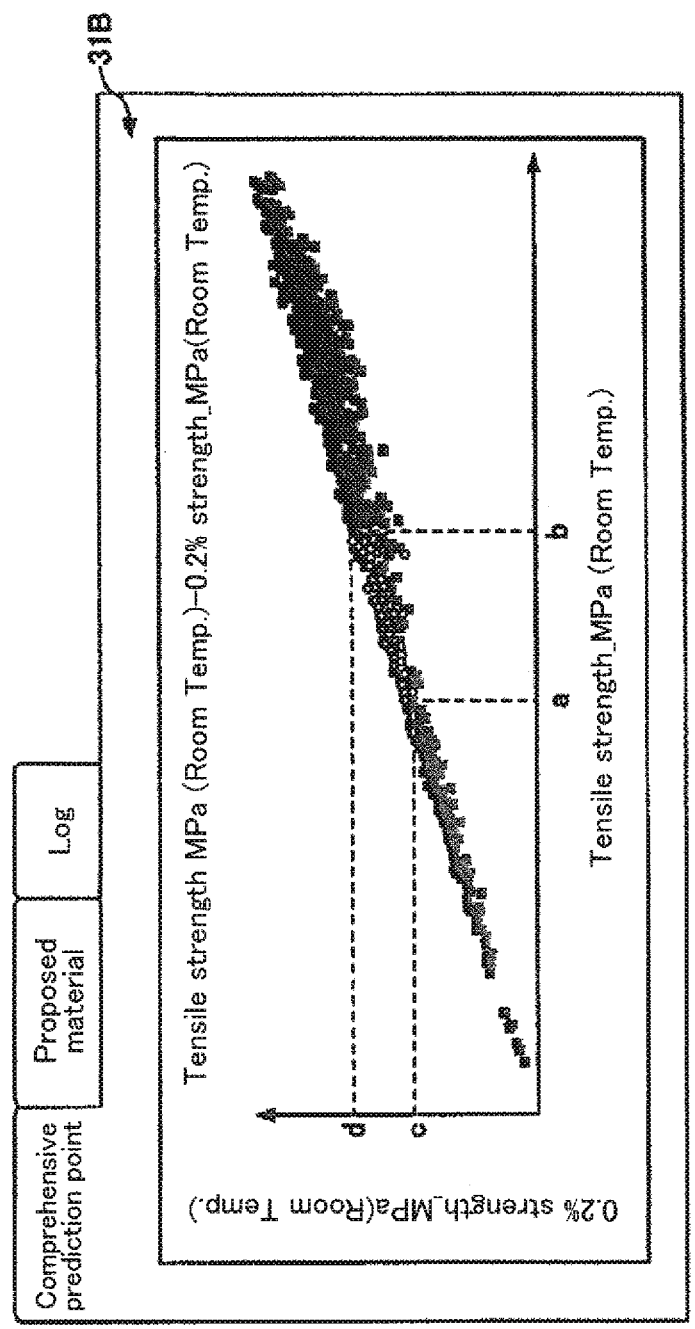
FIG. 7 is a diagram showing one example of an output screen of a reverse problem analysis unit.
Figure 8:
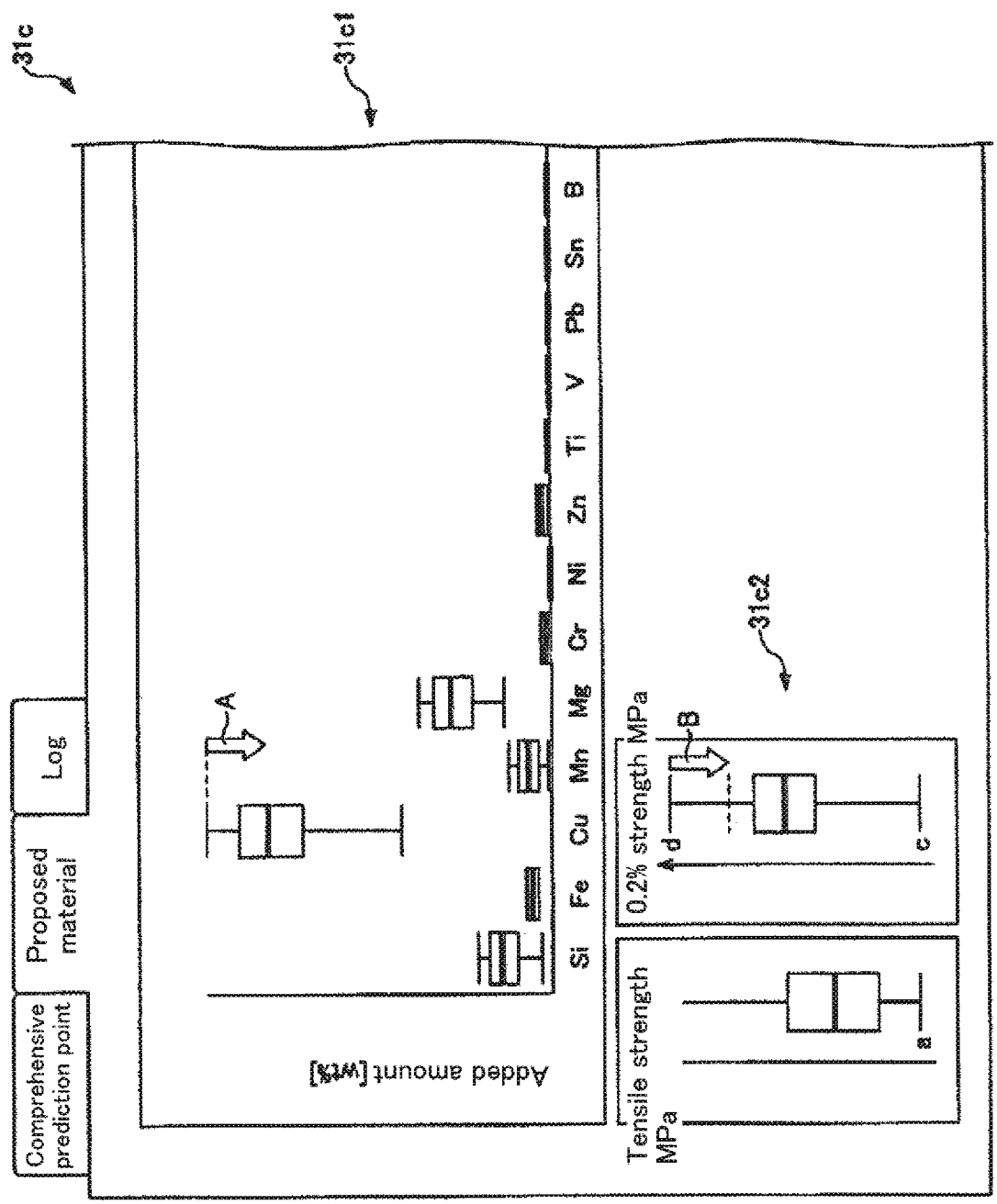
FIG. 8 is a diagram showing one example of an output screen of the reverse problem analysis unit.

FIG. 7 and FIG. 8 are diagrams showing examples of the output screens 31B and 31C of the reverse problem analysis unit 20. The output screens 31B and 31C are displayed on the GUI 30 via, for example, the information display unit 31. In the output screen 31B shown in FIG. 7, each point of the comprehensive prediction points is plotted with a black square on the two-dimensional coordinate system with the "tensile strength" and the "0.2% strength" as each axis. In addition, the points satisfying the required properties (the "tensile strength" is in the range of a to b, and the "0.2% strength" is in the range of c to d) set in FIG. 6 are plotted with white circles. Further, in the output screen 31C shown in FIG. 8, box-and-whisker plots 31C1 of the compositions satisfying the required properties are displayed in the upper part, and the box-and-whisker plots 31C2 of the compositions satisfying the required properties are displayed in the lower part.

Note that the reverse problem analysis unit 20 can also output the range of the production condition satisfying the required properties. The reverse problem analysis unit 20 may include the production condition in the input information to the design condition extraction unit 22. In this case, the reverse problem analysis unit 20 will output the compositions satisfying the inputs of the required properties and the request production condition.

As described above, the reverse problem analysis unit 20 is configured such that the production conditions (compositions or design conditions) satisfying multidimensional required properties can be simultaneously extracted by simply performing the operation for specifying the ranges of the multidimensional required properties by the material designer. Further, without using a simulation or a learning model for the reverse problem analysis, the design condition-material property table 14 generated by the forward problem analysis unit 10 is used. Therefore, the calculation cost can also be significantly reduced.

The GUI 30 includes an information display unit 31.

The information display unit 31 displays the output of the forward problem analysis unit 10 or that of the reverse problem analysis unit 20. For example, as shown in FIG. 7 and FIG. 8, the range of the required property and that of the design condition relating to the data set extracted by the design condition extraction unit 22 are displayed.

The GUI 30 may further include a design condition adjustment unit 32.

The design condition adjustment unit 32 adjusts the range of the design condition of the data set extracted by the design condition extraction unit 22. The design condition adjustment unit 32 can adjust the range of the design condition by, for example, the material designer's input operation of changing the composition range of the output screen 31c to be displayed on the GUI 30.

Further, the design condition extraction unit 22 can further narrow down the data sets extracted according to the required properties to data sets satisfying the design condition adjusted by the above-described design condition adjustment unit 32.

In this case, as shown by the arrow A in FIG. 8, for example, when an operation of lowering the maximum value of the predetermined raw material (cu in the example in FIG. 8) on the box-and-whisker plot 31C1 of the composition, narrowing down of the data sets is performed by the design condition adjustment unit 32 and the design condition extraction unit 22 in response to this operation. As a result, the box-and-whisker plot 31C2 of each required property is updated according to the narrowed down data set. For example, as indicated by the arrow B in FIG. 8, the maximum value of the 0.2% strength of the required property is displayed in a decreased manner in response to the decrease in the maximum value of Cu. The material designer can observe the variation of the property according to the adjustment of the composition range on the output screen 31C to narrow down to a desired composition range.

The reverse problem analysis unit 20 outputs the design conditions satisfying the required properties, but these design conditions are only those automatically extracted from the comprehensive prediction points of the design condition-material property table 14, and the production constraints, such as, e.g., the difficulty of the actual production, have not been considered. For example, there are various production constraints, such as, e.g., it is difficult to handle and therefore it is actually difficult to produce, it takes longer time to produce, it takes time for the processing, the composition causes nests when casting, it is impossible to mold, and it is possible to produce without considering the cost but impossible to produce by using an ordinary plant facility. In a case where the GUI 30 has the design condition adjustment unit 32, it is possible to narrow down the production conditions satisfying the required properties considering the production constraints based on the material designer's rule of thumb by making it possible for the material designer to adjust the output results of the reverse problem analysis unit 20 by using the design condition adjustment unit 32. That is, it becomes possible to perform the material design in which the prediction by machine learning and the material designer's experience work together.

Figure 9:
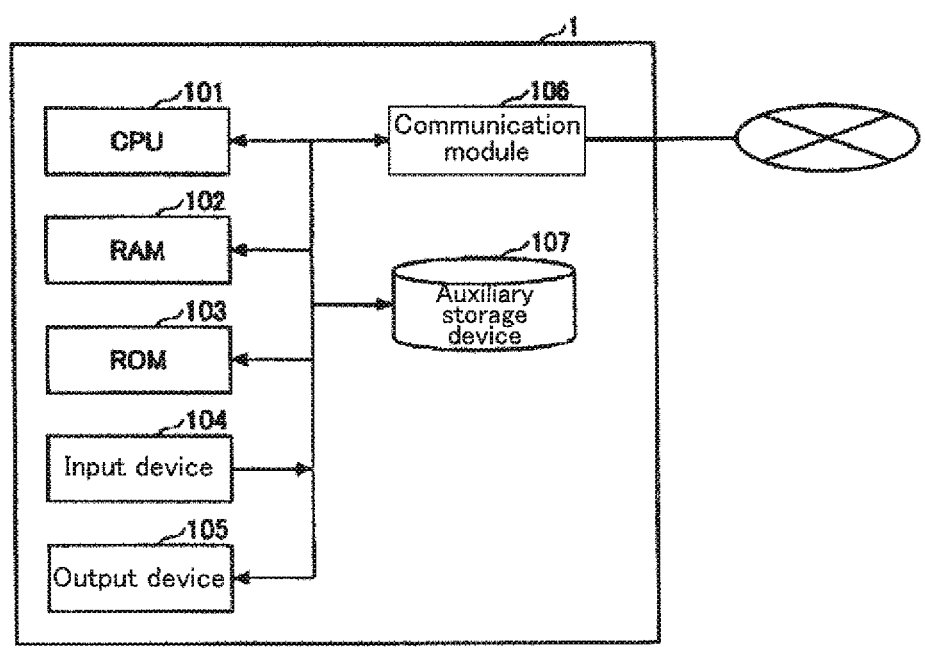
FIG. 9 is a block diagram showing a hardware configuration of a material design device.

FIG. 9 is a block diagram showing a hardware configuration of the material design device 1. As shown in FIG. 9, the material design device 1 may be configured as a computer system physically including a CPU (Central Processing Unit) 101, a RAM (Random Access Memory) 102 as main storage devices and a ROM (Read Only Memory) 103, an input device 104, such as, e.g., a keyboard and a mouse, an output device 105, such as, e.g., a display, a communication module 106, such as, e.g., a network card, which is a data transmission and reception device, and an auxiliary storage device 107, such as, e.g., a hard disc.

Each function of the material design device 1 shown in FIG. 9 is realized by reading predetermined computer software (material design program) on hardware, such as, e.g., a CPU 101 and a RAM 102 to operate the communication module 106, the input device 104, and the output device 105 under the control of the CPU 101 and to read and write the data in the RAM 102 and the auxiliary storage device 107. That is, by running the material design program of this embodiment on a computer, the material design device 1 functions as the design condition setting unit 11, the comprehensive prediction point generation unit 12, the required property setting unit 21, the design condition extraction unit 22, the information display unit 31, and the design condition adjustment unit 32 in FIG. 1. It is also possible to realize a model generation function of generating the learned model 13 in which the correspondence between the input information including design condition of the material to be designed and the output information including the material property value is acquired by machine learning and a data set generation function of storing a data set in which the material property value calculated by inputting the comprehensive prediction point generated by the comprehensive prediction point generation function to the learned model 13 is associated with each point of the comprehensive prediction points to the design condition-material property table 14. The design condition-material property table 14 shown in FIG. 1 can be realized by a part of a storage device (the RAM 102, the ROM 103, the auxiliary storage device 107, or the like) provided in the computer. The GUI 30 shown in FIG. 1 can be realized by the output device 105 or the input device 104 provided in a computer.

The material design program of this embodiment is stored, for example, in a storage device provided by a computer. The material design program may be configured such that a part or all of the program is transmitted via a transmission medium, such as, e.g., a communication line, and is received and recorded (including "installation") by a communication module or the like provided in a computer. The material design program may also be configured such that a part or all of the program may be recorded (including "installation") in a computer from a state in which the program is stored in a portable storage medium, such as, e.g., a CD-ROM, a DVD-ROM, and a flash memory.

Figure 10:
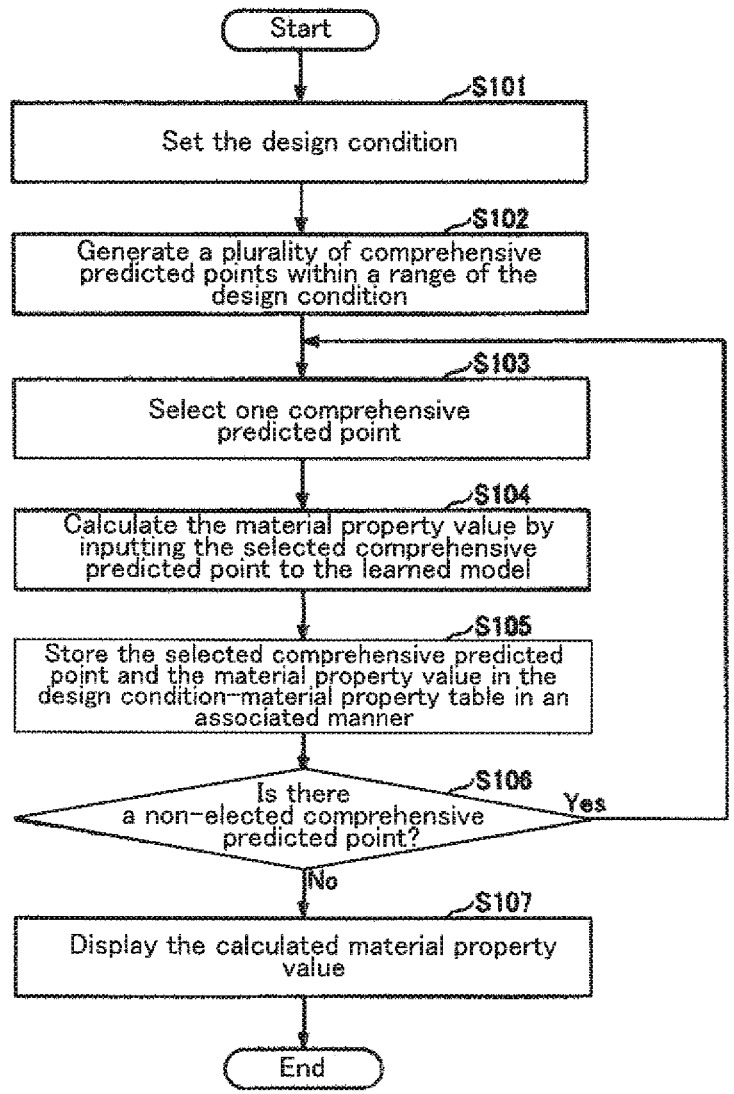
FIG. 10 is a flowchart of a forward problem analysis processing performed by a forward problem analysis unit.
Figure 11:
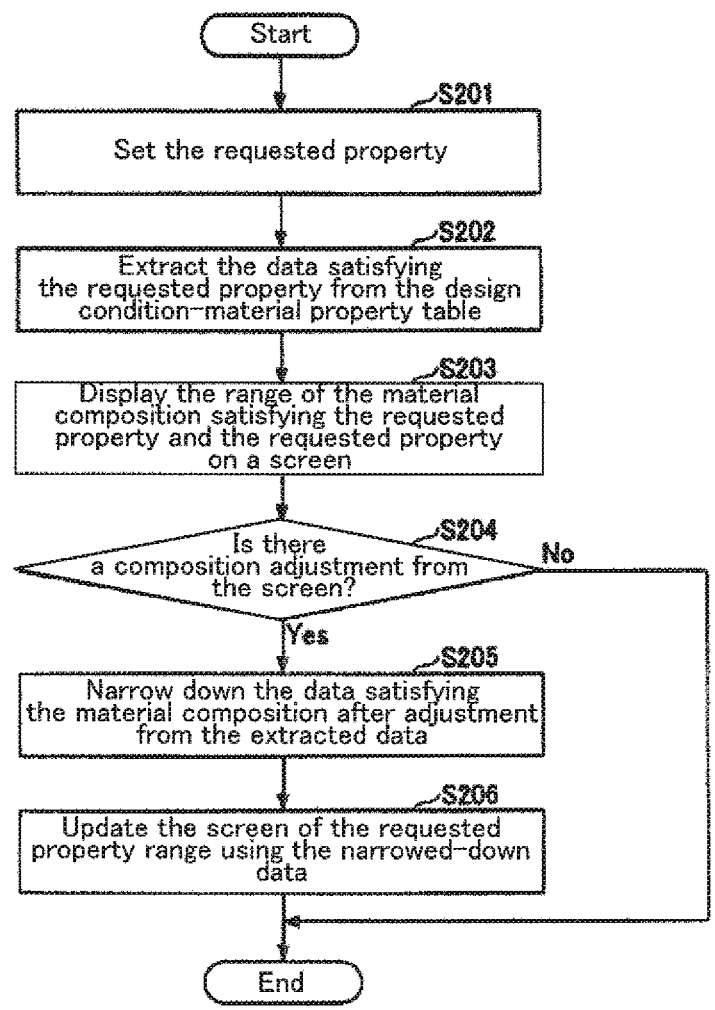
FIG. 11 is a flowchart of a reverse problem analysis processing performed by a reverse problem analysis unit and a design condition adjustment unit.

With reference to FIG. 10 and FIG. 11, a material design method using the material design device 1 according to the embodiment will be described. FIG. 10 is a flowchart of the forward problem analysis processing performed by the forward problem analysis unit 10.

Note that before performing the forward problem analysis processing of FIG. 10, the processing (model generation step) of generating the learned model 13 in which the correspondence between the input information including the design condition of the material to be designed and the output information including the material property value is acquired by machine learning is performed. The model generation step may be performed by the material design device 1. Alternatively, it may be configured such that the model generation step is performed by another device and the material design device 1 acquires the learned model 13 generated by the above-described another device.

In Step S101, the specified range of the design condition of the aluminum alloy which is a material to be designed is set by the design condition setting unit 11 (Design Condition Setting Step). The design condition setting unit 11 displays, for example, the input screens 11A and 11B shown in FIG. 2 and FIG. 3 on the GUI 30 to prompt the material designer to input specified ranges.

In Step S102, a plurality of comprehensive prediction points is generated by the comprehensive prediction point generation unit 12 within the specified range of the design condition set in Step S101 (Comprehensive Prediction Point Generation Step).

In Step S103 to S106, the forward problem analysis unit 10 stores the data set in which the material property values calculated by inputting the comprehensive prediction points generated in Step S102 to the learned model 13 are associated with each point of the comprehensive prediction points in the design condition-material property table 14 (Data Set Generation Step).

First, in Step S103, one comprehensive prediction point is selected. In Step S104, a material property value is calculated by inputting the comprehensive prediction point selected in Step S103 to the learned model 13. In Step S105, the comprehensive prediction point of the input of the learned model 13 selected in Step S103 and the material property value of the output are associated with each other and stored in the design condition-material property table 14. One data set is generated by the processing of Step S103 to S105.

In Step S106, it is determined whether or not there is an unselected comprehensive prediction point. In a case where there is an unselected comprehensive prediction point (Yes in Step S106), the process returns to Step S103 to repeat the generation of a data set. In a case where all comprehensive prediction points have been selected (No in Step S106), the generation of the data set is finished, and the process proceeds to Step S107.

In Step S107, the material property value of each comprehensive prediction point calculated in Step S104 is displayed on the GUI 30 by the information display unit 31. The information display unit 31 displays, for example, the output screen 31A exemplified in FIG. 4 on the GUI 30. Upon completion of the process of Step S107, the forward problem analysis processing of the main control flow ends.

FIG. 11 is a flowchart of reverse problem analysis processing performed by the reverse problem analysis unit 20 and the design condition adjustment unit 32.

In Step S201, the specified ranges of the required properties of the aluminum alloy which is a material to be designed are set by the required property setting unit 21 (Required Property Setting Step). The required property setting unit 21 displays, for example, the input screen 21A shown in FIG. 6 on the GUI 30 to prompt the material designer to input specified ranges.

In Step S202, data sets satisfying the required properties set in Step S201 are extracted from the design condition-material property table 14 by the design condition extraction unit 22 (Design Condition Extraction Step).

In Step S203, the range of the material compositions satisfying the required properties specified in Step S201 and the required properties are displayed on the GUI 30 by the information display unit 31 using the data sets extracted in Step S203. The information display unit 31 displays, for example, the output screens 31B and 31C exemplified in FIG. 7 and FIG. 8 on the GUI 30.

In Step S204, whether or not the operation of the composition adjustment has been performed by the material designer is determined in the output screen 31C showing the ranges of the material compositions satisfying the required properties by the design condition adjustment unit 32. As described with reference to the arrow A in FIG. 8, the material designer can perform the operation to change the position of the maximum value or the minimum value of the box-and-whisker plot of the material composition in the output screen 31C (Design Condition Adjustment Step). When this operation has been performed (Yes in Step S204), the information of the composition range after the adjustment is output to the design condition extraction unit 22 by the design condition adjustment unit 32, and the process proceeds to Step S205. When there was no operation (No in Step S204), the reverse problem analysis processing of the main control flow is terminated.

In Step S205, since the operation of the composition adjustment has been detected in Step S204, the data satisfying the material compositions after the composition range adjustments is narrowed down by the design condition extraction unit 22 from the data sets extracted in Step S202 (Narrow Down Step).

In Step S206, the output screen 31C of the required properties displayed in Step S203 is updated by the information display unit 31 using the data set narrowed down in Step 205. Upon completion of the processing in Step S206, the reverse problem analysis processing is terminated.

Effects of this embodiment will be described. As the forward problem analysis unit 10, the material design device 1 of this embodiment is provided with the design condition setting unit 11 for setting the specified ranges of the design conditions of the material to be designed, the comprehensive prediction point generation unit 12 for generating a plurality of comprehensive prediction points within the specified range set by the design condition setting unit 11, and the design condition-material property table 14 for storing the data set in which the material property values calculated by inputting the comprehensive prediction points generated by the comprehensive prediction point generation unit 12 to the learned model 13 are associated with each point of the comprehensive prediction points. Further, as the reverse problem analysis unit 20, the material design device 1 of this embodiment is provided with the required property setting unit 21 for setting the specified range of the required properties of the material to be designed and the design condition extraction unit 22 for extracting the data sets satisfying the required properties set by the required property setting unit 21 from the design condition-material property table 14.

As described above, in this embodiment, during the performance of the forward problem analysis, data sets to be used in the reverse problem analysis are generated and stored in the design condition-material property table 14. And at the time of performing the reverse problem analysis, data sets satisfying the required properties are extracted by referring to the design condition-material property table 14. In other words, the reverse problem analysis performs only the task of searching for the design condition-material property table 14 without performing any numerical value calculations, such as, e.g., simulation and model calculation. Therefore, the calculation cost can be greatly reduced, and the optimal solution of the design condition satisfying the desired material properties can be derived in a short time.

Further, in a case of performing a reverse problem analysis by a conventional simulation or in a case of adopting a machine learning system to a reverse problem analysis, in a case where there is a plurality of required properties, calculations are performed to gradually reach the optimal solution while performing the adjustment for each property in turn, and candidate material searches will not be collectively performed to satisfy several types of properties at the same time. In many cases, a plurality of material properties has a trade-off relationship, and the trial and error are repeated until it reaches the optimal solution. Therefore, it takes a long time to acquire the optimal solution of the design conditions satisfying the desired material properties. On the other hand, in this embodiment, by setting a plurality of output (material properties) of the learned model 13 and generating items of a plurality of material properties in the design condition-material property table 14, in the reverse problem analysis, the candidate material searches can be collectively performed to satisfy the plurality of types of material properties. With this, even in the case of setting a plurality of types of required properties, the time required to derive the optimal solution can be greatly reduced as compared with the conventional method.

Further, the data set group stored in the design condition-material property table 14 is information derived from a large number of comprehensive prediction points automatically generated in the forward problem analysis. Therefore, the increment of each item of the design condition and the material property is sufficiently small, and the resolution is high. Therefore, in the reverse problem analysis, it is possible to perform the prediction of the design condition satisfying the required property with high accuracy.

Preferably, the material design device 1 is provided with the design condition adjustment unit 32 for adjusting the range of the design condition of the data set extracted by the design condition extraction unit 22. In a case where the material design device 1 has the design condition adjustment unit 32, the design condition extraction unit 22 further narrows down the data sets satisfying the design conditions adjusted by the design condition adjustment unit 32.

In this case, depending on the required properties, the design condition extraction unit 22 can perform the narrowing down of the design condition mechanically extracted by the design condition-material property table 14 by considering the production constraints and the like based on the experience of the material designer. With this, it becomes possible to perform the material design in which the prediction by machine learning and the material designer's experiences work together, which in turn can extract design conditions that are easier to perform the production.

Further, the material design device 1 of this embodiment is provided with the information display unit 31 for displaying the required properties for the data sets extracted by the design condition extraction unit 22 and the range of the design condition. Furthermore, in a case where the material design device 1 is provided with the design condition adjustment unit 32, the design condition adjustment unit 32 adjusts the range of the design condition according to the user's operation of changing the range of the design condition displayed on the information display unit 31.

In a case where the material design device 1 is provided with the design condition adjustment unit 32, the adjustment operation of the range of the design condition by the material designer can be performed more intuitively on the GUI 30, which can be simplified by reducing the burden of the adjustment operation. Further, the result by the adjustment operation can be reflected immediately on the output screens 31B and 31C. Therefore, the interactive adjustment operation by the material designer can be performed, which makes it possible to perform the adjustment of the range of the design condition more efficiently.

The embodiment has been described above by referring to specific examples. However, the present disclosure is not limited to these specific examples. Modifications in which these specific examples are appropriately modified by those skilled in the art are also encompassed by the scope of the present disclosure as long as they are provided with the features of the present disclosure. Each element included in each of the specific examples described above and the arrangement, condition, shape, and the like thereof are not limited to those exemplified and can be changed as appropriate. Each element provided in each of the above-described specific examples can be appropriately changed in the combination as long as no technical inconsistency occurs.

In the above-described embodiment, as a material to be designed, an aluminum alloy working material (plastic working material), such as, e.g., a rolled material, an extruded material, a drawn material, and a forged material have been described as an example. However, the present invention is not limited thereto. In the present invention, as a material to be designed, a casting material, such as, e.g., a casting material of an aluminum alloy, may be used.

In the above-described embodiment, an aluminum alloy was exemplified as a material to be designed by the material design device 1, but alloys other than an aluminum alloy may be used. Such alloys include a Fe alloy (iron alloy), a Cu alloy (copper alloy), a Ni alloy (nickel alloy), a Co alloy (Cobalt alloy), a Ti alloy (titanium alloy), an Mg alloy (magnesium alloy), a Mn alloy (manganese alloy), and a Zn alloy (zinc alloy). The material to be designed may be an inorganic material in general other than alloys, or may be an organic material in general. In short, the material to be designed includes materials composed of a plurality of compositions, or materials produced by combining a plurality of production conditions/treatments (such as, e.g., temperature, pressure, processing, oxidation treatment, acid treatment, proportion, mixture, and stirring).

Further, in the present invention, as an iron alloy as a material to be designed, an iron alloy working material and a casting iron material (iron alloy casting material) are included. The iron alloy working material includes a steel material and a stainless steel, and the casting iron material includes a cast steel material. In the iron alloy working material, as the material composition of the design condition includes at least one of C, B, N, Si, P, S, Mn, Al, Ti, V, Cr, Co, Ni, Cu, Zr, Nb, Mo, and W. As the production condition, it includes at least one of a molten metal temperature at the time of material casting, a casting speed, an amount of cooling water, a material heating temperature at the time of hot working, a material heating time at the time of hot working, a working speed, a rolling reduction, a hot working temperature, a cooling rate immediately after working, a natural aging time, a heat treatment temperature, a heat treatment time, and a cooling rate of a heat treatment. The material property value of an iron alloy working material includes at least one of 0.2% strength, tensile strength, elongation, Young's modulus, a linear expansion coefficient, an austenite grain size, a ferrite grain size, an impact property, a fatigue property, an SCC property, and an SSC property.

In a casting iron material, the material composition of the design condition includes at least one of C, B, N, Si, P, S, Mn, Al, Ti, V, Cr, Co, Ni, Cu, Zr, Nb, Mo, W, Ca, Mg, and Ce. The production condition includes at least one of a molten metal temperature at the time of casting, a casting speed, a solidification rate, a cooling rate after solidification, a heat treatment temperature, a heat treatment time, and a cooling rate of a heat treatment. The material property value of the casting iron material includes at least one of the 0.2% strength, the tensile strength, the elongation, the Young's modulus, the linear expansion coefficient, the impact property, and the fatigue property.

In the present invention, as a copper alloy as a material to be designed, it includes a copper alloy working material and a copper alloy casting material. In the copper alloy working material, the material composition of the design condition includes at least one of Zn, Pb, Bi, Sn, Fe, P, Al, Hg, Ni, Mn, Se, Te, O, S, Zr, Be, Co, Ti, and As. The production condition includes at least one of the molten metal temperature at the time of the material casting, the casting speed, the amount of cooling water, the homogenization temperature, the homogenization time, the cooling rate after homogenization, the material heating temperature at the time of hot working, the working speed, the cooling rate immediately after the working, the natural annealing temperature, the artificial aging temperature, the artificial aging time, the hot working temperature, the annealing temperature, and the annealing time. The material property value of a copper alloy working material includes at least one of 0.2% strength, tensile strength, elongation, conductivity, thermal conductivity, Young's modulus, and a linear expansion coefficient.

In the copper alloy casting material, the material composition of the design condition includes at least one of Zn, Pb, Bi, Sn, Fe, P, Al, Hg, Ni, Mn, Se, Te, O, S, Zr, Be, Co, Ti, and As. The production condition includes at least one of a molten metal temperature at the time of casting, a solution treatment temperature, a solution treatment time, a natural aging time, an artificial aging temperature, an artificial aging time, an annealing temperature, and an annealing time. The material property value of a copper alloy casting material includes at least one of 0.2% strength, tensile strength, elongation, conductivity, thermal conductivity, Young's modulus, and a linear expansion coefficient.

Further, in the present invention, as the material composition of the design condition in a titanium alloy as a material to be designed, it includes at least one of Al, Sn, V, Mo, Zr, Pd, Si, Cr, Ru, Ta, Co, and Ni. As the production condition, it includes a molten metal temperature at the time of casting, a solution treatment temperature, a solution treatment time, an artificial aging temperature, an artificial aging time, an annealing temperature, and an annealing time. The material property value of a titanium alloy includes at least one of 0.2% strength, tensile strength, elongation, Young's modulus, a linear expansion coefficient, and a fatigue property.

INDUSTRIAL APPLICABILITY

The material design device according to the present invention can be used in designing a material composed of a plurality of compositions or a material to be designed including a material produced by combining a plurality of production conditions.

This application claims Japanese Patent Application No. 2018-204439, filed on Oct. 30, 2018, the disclosure of which is incorporated herein by reference in its entirety.

The terms and expressions used herein are for illustration purposes only and are not used for limited interpretation, do not exclude any equivalents of the features shown and stated herein, and it should be recognized that the present invention allows various modifications within the scope of the present invention as claimed.

DESCRIPTION OF SYMBOLS

1: Material design device
11: Design condition setting unit
12: Comprehensive prediction point generation unit
13: Learned model
14: Design condition-material property table
21: Required property setting unit
22: Design condition extraction unit
31: Information display unit
32: Design condition adjustment unit

The invention claimed is:

1. A material design device for designing a material to be designed including a material composed of a plurality of compositions or a material produced by combining a plurality of production conditions,
the material design device comprising:
an information display unit to display an input screen to prompt a user to input a maximum value and a minimum value for a design condition, wherein the maximum value and the minimum value define the specified range of the design condition, wherein the design condition includes a material composition and a production condition;
a learned model which is trained with a correspondence between user input information including the design condition and output information including a material property value;
a comprehensive prediction point generation unit configured to generate a plurality of comprehensive prediction points within the specified range of the design condition defined by the maximum value and the minimum value inputted using the input screen, wherein the plurality of comprehensive prediction points are input into the learned model to associate the material property value with at least one of the comprehensive prediction points;
a design condition-material property table configured to store data sets in which the material property value calculated by inputting the comprehensive prediction points generated by the comprehensive prediction point generation unit to the learned model is associated with each point of the comprehensive prediction points;
a required property setting unit configured to set a specified range of a required property of the material to be designed;
a design condition extraction unit configured to extract data sets satisfying the required property set by the required property setting unit from the design condition-material property table;
the information display unit configured to display the requested property and the range of the composition related to the data sets extracted by the design condition extraction unit;
a design condition adjustment unit configured to adjust the range of the composition of the data set extracted by the design condition extraction unit in response to a user operation that changes the range of the composition displayed on the information display unit; and
a narrow down unit configured to narrow down from the extracted data sets satisfying the requested property to the data sets satisfying the composition adjusted by the design condition adjustment unit,
wherein the output on the information display unit is updated based on the narrowed down data.

2. The material design device as recited in claim 1, wherein the required property includes a plurality of properties, and wherein the design condition extraction unit extracts the data set that simultaneously satisfies the plurality of required properties.

3. The material design device as recited in claim 2, wherein the material to be designed is an inorganic material.

4. The material design device as recited in claim 3, wherein the material to be designed is an alloy material.

5. The material design device as recited in claim 4,
wherein the material to be designed is an aluminum alloy working material,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of material casting, a casting speed, an amount of cooling water, a homogenization temperature, a homogenization time, and a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, Young's modulus, a linear expansion coefficient, and a fatigue property.

6. The material design device as recited in claim 4, wherein the material to be designed is an aluminum alloy casting material, wherein the material composition includes at least one of Si, Fe, Cu, Mn, Mg, Cr, Ni, Zn, Ti, V, Pb, Sn, Bi, B, P, Zr, and Sr, wherein the production condition includes at least one of a molten metal temperature at the time of casting, a solution treatment temperature, a solution treatment time, a natural aging time, an artificial aging temperature, an artificial aging time, an annealing temperature, and annealing time, and wherein the material property value includes at least one of 0.2% strength, tensile strength, elongation, Young's modulus, a linear expansion coefficient, and a fatigue property.

7. The material design device as recited in claim 4, wherein the material to be designed is an iron alloy working material, wherein the material composition includes at least one of C, B, N, Si, P, S, Mn, Al, Ti, V, Cr, Co, Ni, Cu, Zr, Nb, Mo, and W, wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and wherein the material property value includes at least one of 0.2% strength, tensile strength, elongation, Young's modulus, a linear expansion coefficient, an austenite grain size, a ferrite grain size, an impact property, and a fatigue property.

8. The material design device as recited in claim 4, wherein the material to be designed is a casting iron material, wherein the material composition includes at least one of C, B, N, Si, P, S, Mn, Al, Ti, V, Cr, Co, Ni, Cu, Zr, Nb, Mo, W, Ca, Mg, and Ce, wherein the production condition includes at least one of a molten metal temperature at a time of casting, a casting speed, a solidification rate, a cooling rate after solidification, a heat treatment temperature, a heat treatment time, and a cooling rate of a heat treatment, and wherein the material property value includes at least one of 0.2% strength, tensile strength, elongation, Young's modulus, a linear expansion coefficient, an impact property, and a fatigue property.

9. The material design device as recited in claim 4, wherein the material to be designed is a copper alloy working material, wherein the material composition includes at least one of Zn, Pb, Bi, Sn, Fe, P, Al, Hg, Ni, Mn, Se, Te, O, S, Zr, Be, Co, Ti, and As, wherein the production condition includes at least one of a molten metal temperature at a time of material casting, a casting speed, an amount of cooling water, a homogenization temperature, a homogenization time, a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and wherein the material property value includes at least one of 0.2% strength, tensile strength, elongation, conductivity, thermal conductivity, Young's modulus, and a linear expansion coefficient.

10. The material design device as recited in claim 4, wherein the material to be designed is a copper alloy casting material, wherein the material composition includes at least one of Zn, Pb, Bi, Sn, Fe, P, Al, Hg, Ni, Mn, Se, Te, O, S, Zr, Be, Co, Ti, and As, wherein the production condition includes at least one of a molten metal temperature at a time of casting, a solution treatment temperature, a solution treatment time, a natural aging time, an artificial aging temperature, an artificial aging time, an annealing temperature, and an annealing time, and wherein the material property value includes at least one of 0.2% strength, tensile strength, elongation, conductivity, thermal conductivity, Young's modulus, and a linear expansion coefficient.

11. The material design device as recited in claim 4, wherein the material to be designed is a titanium alloy, wherein the material composition includes at least one of Al, Sn, V, Mo, Zr, Pd, Si, Cr, Ru, Ta, Co, and Ni, wherein the production condition includes a molten metal temperature at a time of casting, a solution treatment temperature, a solution treatment time, and an artificial aging temperature, an artificial aging time, an annealing temperature, and an annealing time, and wherein the material property value includes at least one of 0.2% strength, tensile strength, elongation, Young's modulus, a linear expansion coefficient, and a fatigue property.

12. A material design method for designing a material to be designed including a material composed of a plurality of compositions or a material produced by combining a plurality of production conditions, the material design method comprising:

an input display step of displaying an input screen at an information display unit to prompt a user to input a maximum value and a minimum value for a design condition, wherein the maximum value and the minimum value define the specified range of the design condition, wherein the design condition includes a material composition and a production condition;

a model generation step of generating a learned model which is trained with a correspondence between user input information including the design condition and output information including a material property value;

a comprehensive prediction point generation step of generating a plurality of comprehensive prediction points within the specified range of the design condition defined by the maximum value and the minimum value inputted using the input screen, wherein the plurality of comprehensive prediction points are input into the learned model to associate the material property value with at least one of the comprehensive prediction points;

a data set generation step of storing, to a design condition-material property table, a data set in which the material property value calculated by inputting the comprehensive prediction points generated by the comprehensive prediction point generation step to the learned model is associated with each point of the comprehensive prediction points;

a required property setting step of setting a specified range of a required property of the material to be designed;

a design condition extraction step of extracting data sets satisfying the required property set by the required property setting step from the design condition-material property table;

an information display step of displaying the requested property and the range of the composition related to the data sets extracted by the design condition extraction step on the information display unit;

a design condition adjustment step of adjusting the range of the composition of the data set extracted by the design condition extraction step in response to a user operation that changes the range of the composition displayed on the information display unit;

a narrow down step of further narrowing down from the extracted data sets satisfying the requested property to the data sets satisfying the composition adjusted by the design condition adjustment step; and updating the output on the information display unit based on the narrowed down data.

13. The material design method as recited in claim 12, wherein the material to be designed is an aluminum alloy working material,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of material casting, a casting speed, an amount of cooling water, a homogenization temperature, a homogenization time, a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, Young's modulus, a linear expansion coefficient, and a fatigue property.

14. The material design method as recited in claim 12, wherein the material to be designed is an aluminum alloy casting material,
wherein the material composition includes at least one of Si, Fe, Cu, Mn, Mg, Cr, Ni, Zn, Ti, V, Pb, Sn, Bi, B, P, Zr, and Sr,
wherein the production condition includes at least one of a molten metal temperature at a time of casting, a solution treatment temperature, a solution treatment time, a natural aging time, an artificial aging temperature, an artificial aging time, and an annealing temperature, and an annealing time, and
wherein the material property value includes at least one of 0.2% strength, tensile strength, elongation, Young's modulus, a linear expansion coefficient, and a fatigue property.

15. The material design method as recited in claim 12, wherein the material to be designed is an iron alloy working material,
wherein the material composition includes at least one of C, B, N, Si, P, S, Mn, Al, Ti, V, Cr, Co, Ni, Cu, Zr, Nb, Mo, and W,
wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and
wherein the material property value includes at least one of 0.2% strength, tensile strength, elongation, Young's modulus, a linear expansion coefficient, an austenite grain size, a ferrite grain size, an impact property, and a fatigue property.

16. The material design method of claim 12, wherein the material to be designed is a casting iron material,
wherein the material composition includes at least one of C, B, N, Si, P, S, Mn, Al, Ti, V, Cr, Co, Ni, Cu, Zr, Nb, Mo, W, Ca, Mg, and Ce,
wherein the production condition includes at least one of a molten metal temperature at a time of casting, a casting speed, a solidification rate, a cooling rate after solidification, a heat treatment temperature, a heat treatment time, and a cooling rate of a heat treatment, and
wherein the material property value includes at least one of 0.2% strength, tensile strength, elongation, Young's modulus, a linear expansion coefficient, an impact property, and a fatigue property.

17. The material design method as recited in claim 12, wherein the material to be designed is a copper alloy working material,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of a molten metal temperature at a time of material casting, a casting speed, an amount of cooling water, a homogenization temperature, a homogenization time, a cooling rate after homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, conductivity, thermal conductivity, Young's modulus, and a linear expansion coefficient.

18. The material design method of claim 12, wherein the material to be designed is a copper alloy casting material,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of a molten metal temperature at a time of casting, a solution treatment temperature, a solution treatment time, a natural aging time, an artificial aging temperature, an artificial aging time, an annealing temperature, and an annealing time, and
wherein the material property value includes at least one of 0.2% strength, tensile strength, elongation, conductivity, thermal conductivity, Young's modulus, and a linear expansion coefficient.

19. The material design method as recited in claim 12, wherein the material to be designed is a titanium alloy,
wherein the material composition includes at least one of Al, Sn, V, Mo, Zr, Pd, Si, Cr, Ru, Ta, Co, and Ni,
wherein the production condition includes a molten metal temperature at a time of casting, a solution treatment temperature, a solution treatment time, an artificial aging temperature, an artificial aging time, an annealing temperature, and an annealing time, and wherein the material property value includes at least one of 0.2% strength, tensile strength, elongation, Young's modulus, a linear expansion coefficient, and a fatigue property.

20. A non-transitory recording medium storing a material design program for designing a material to be designed including a material composed of a plurality of compositions or a material produced by combining a plurality of production conditions, the material design program configures a computer to execute:

an input display function of displaying an input screen at an information display unit to prompt a user to input a maximum value and a minimum value for a design condition, wherein the maximum value and the minimum value define the specified range of the design condition, wherein the design condition includes a material composition and a production condition;

a model generation function of generating a learned model which is trained with a correspondence between user input information including the design condition and output information including a material property value is acquired by machine learning;

a comprehensive prediction point generation function of generating a plurality of comprehensive prediction points within the specified range of the design condition defined by the maximum value and the minimum value inputted using the input screen, wherein the plurality of comprehensive prediction points are input into the learned model to associate the material property value with at least one of the comprehensive prediction points;

a data set generation function of storing, in a design condition-material property table, data sets in which the material property value calculated by inputting the comprehensive prediction points generated by the comprehensive prediction point generation function to the learned model is associated with each point of the comprehensive prediction points;

a required property setting function of setting a specified range of a required property of the material to be designed;

a design condition extraction function of extracting the data set satisfying the required property set by the required property setting function from the design condition-material property table;

an information display function of displaying the requested property and the range of the composition related to the data sets extracted by the design condition extraction function on the information display unit;

a design condition adjustment function of adjusting the range of the composition of the data set extracted by the design condition extraction step in response to a user operation that changes the range of the composition displayed on the information display unit; and a narrow down function of further narrowing down from the extracted data sets satisfying the requested property to the data sets satisfying the composition adjusted by the design condition adjustment function, wherein the output on the information display unit is updated based on the narrowed down data.

21. The material design program as recited in claim 20, wherein the material to be designed is an aluminum alloy working material, wherein the material composition includes at least one of Si, Fe, Cu, Mn, Mg, Cr, Ni, Zn, Ti, V, Pb, Sn, Bi, B, P, Zr, and Sr, wherein the production condition includes at least one of a molten metal temperature at a time of material casting, a casting speed, an amount of cooling water, a homogenization temperature, a homogenization time, and a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and wherein the material property value includes at least one of 0.2% strength, tensile strength, and elongation, Young's modulus, a linear expansion coefficient, and a fatigue property.

22. The material design program as recited in claim 20, wherein the material to be designed is an aluminum alloy casting material, wherein the material composition includes at least one of Si, Fe, Cu, Mn, Mg, Cr, Ni, Zn, Ti, V, Pb, Sn, Bi, B, P, Zr, and Sr, wherein the production condition includes at least one of a molten metal temperature at a time of casting, a solution treatment temperature, a solution treatment time, a natural aging time, an artificial aging temperature, an artificial aging time, an annealing temperature, and an annealing time, and wherein the material property value includes at least one of 0.2% strength, tensile strength, elongation, Young's modulus, a linear expansion coefficient, and a fatigue property.

23. The material design program as recited in claim 20, wherein the material to be designed is an iron alloy working material, wherein the material composition includes at least one of C, B, N, Si, P, S, Mn, Al, Ti, V, Cr, Co, Ni, Cu, Zr, Nb, Mo, and W, wherein the production condition includes at least one of a molten metal temperature at a time of material casting, a casting speed, an amount of cooling water, a material heating temperature at a time of hot working, a material heating time at a time of hot working, a working speed, a rolling reduction, a hot working temperature, a cooling rate immediately after working, a natural aging time, a heat treatment temperature, a heat treatment time, and a cooling rate of a heat treatment, and wherein the material property value includes at least one of 0.2% strength, tensile strength, elongation, Young's modulus, a linear expansion coefficient, an austenite grain size, a ferrite grain size, an impact property, and a fatigue property.

24. The material design program as recited in claim 20, wherein the material to be designed is a casting iron material, wherein the material composition includes at least one of C, B, N, Si, P, S, Mn, Al, Ti, V, Cr, Co, Ni, Cu, Zr, Nb, Mo, W, Ca, Mg, and Ce, wherein the production condition includes at least one of a molten metal temperature at a time of casting, a casting speed, a solidification rate, a cooling rate after solidification, a heat treatment temperature, a heat treatment time, and a cooling rate of a heat treatment, and wherein the material property value includes at least one of 0.2% strength, tensile strength, elongation, Young's modulus, a linear expansion coefficient, an impact property, and a fatigue property.

25. The material design program as recited in claim 20, wherein the material to be designed is a copper alloy working material,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of a molten metal temperature at a time of material casting, a casting speed, an amount of cooling water, a homogenization temperature, a homogenization time, a cooling rate after a homogenization, a material heating temperature at a time of hot working, a working speed, a cooling rate immediately after working, a natural aging time, an artificial aging temperature, an artificial aging time, a hot working temperature, an annealing temperature, and an annealing time, and
wherein the material property value includes at least one of 0.2% strength, tensile strength, elongation, conductivity, thermal conductivity, Young's modulus, and a linear expansion coefficient.

26. The material design program as recited in claim 20, wherein the material to be designed is a copper alloy casting material,
wherein the material composition includes at least one of Zn, Pb, Bi, Sn, Fe, P, Al, Hg, Ni, Mn, Se, Te, O, S, Zr, Be, Co, Ti, and As,
wherein the production condition includes at least one of the molten metal temperature at a time of casting, a solution treatment temperature, a solution treatment time, a natural aging time, an artificial aging temperature, an artificial aging time, an annealing temperature, and an annealing time, and
wherein the material property value includes at least one of 0.2% strength, tensile strength, elongation, conductivity, thermal conductivity, Young's modulus, and a linear expansion coefficient.

27. The material design program as recited in claim 20, wherein the material to be designed is a titanium alloy,
wherein the material composition includes at least one of Al, Sn, V, Mo, Zr, Pd, Si, Cr, Ru, Ta, Co, and Ni,
wherein the production condition includes a molten metal temperature at a time of casting, a solution treatment temperature, a solution treatment time, and an artificial aging temperature, an artificial aging time, an annealing temperature, and an annealing time, and
wherein the material property value includes at least one of 0.2% strength, tensile strength, elongation, Young's modulus, a linear expansion coefficient, and a fatigue property.

28. The material design device as recited in claim 1, wherein the design condition adjustment unit updates the range of the required property displayed on the information display unit in response to a user operation that changes the range of the composition.

29. The material design method as recited in claim 12, wherein the design condition adjustment step updates the range of the required property displayed on the information display unit in response to a user operation that changes the range of the composition.

30. The material design program as recited in claim 20, wherein the design condition adjustment function updates the range of the required property displayed on the information display unit in response to a user operation that changes the range of the composition.

* * * * *